United States Patent [19]
McClaren

[11] 3,736,667
[45] June 5, 1973

[54] GRAIN DRYER
[76] Inventor: Jay L. McClaren, Box 559, Litchfield, Minn. 55355
[22] Filed: June 28, 1971
[21] Appl. No.: 157,373

[52] U.S. Cl..................................34/48, 34/56
[51] Int. Cl..............................F26b 19/00
[58] Field of Search...................34/45, 48, 56

[56] References Cited
UNITED STATES PATENTS

| | | | |
|---|---|---|---|
| 3,404,467 | 10/1968 | Burghard | 34/56 |
| 3,526,969 | 9/1970 | Alms et al. | 34/56 |
| 3,636,638 | 1/1972 | Noyes | 34/56 |

Primary Examiner—Carroll B. Dority, Jr.
Attorney—H. Dale Palmatier et al.

[57] ABSTRACT

A batch dryer for conditioning grain having a clock driven control system including a plurality of successively activated electric circuits for regulating drying bin temperature. The successively activated circuits maintain successively lower drying bin temperature levels defined by individual termostats in each temperature regulating circuit. A clock drive controls a plurality of cam actuated switches which turn the temperature regulating circuits on and off. The control system prevents the loading of wet grain into the drying bin late in the control cycle so that all grain then in the bin has ample time for thorough drying.

The purpose of the foregoing abstract is to enable the Patent Office and the public generally, and especially the scientists, engineers, or practitioners in the art who are not familiar with patent or legal terms of phraseology, to determine quickly from a cursory inspection the nature and essence of the technical disclosure of the application. The abstract is neither intended to define the invention of the application, which is measured by claims, nor is it intended to be limiting as to the scope of the invention in any way.

17 Claims, 2 Drawing Figures

PATENTED JUN 5 1973

3,736,667

INVENTOR.
JAY L. McCLAREN
BY
Williamson, Palmatier
& Bains
ATTORNEYS

GRAIN DRYER

BACKGROUND OF THE INVENTION

This invention comprises a grain dryer, and more particularly, relates to a control system for regulating the operation of a continuously cycling, batch, grain dryer.

Most authorities agree that grain should be harvested shortly after maturity when grain moisture content is approximately 26 percent. Properly timed harvesting can produce increased yields of up to 20 percent and profit increases of as much as 50 percent. A problem arises, however, in storing most grains when their moisture contents are between 25 – 27 percent because such moisture laden or "wet" grain spoils rapidly and cannot be effectively stored. Since most grain destined for long term storage should have a moisture content of approximately 12 percent newly harvested grain must be "conditioned" in grain dryers to remove a significant quantity of moisture.

Although it is important that the grain moisture content be low enough for storage, it is equally important to the grain seller that no more moisture than necessary be removed. Grain with a moisture content greater than the optimum 12 percent level receives a proportionately lower price per bushel than properly dried grain, but grain with a moisture content under 12 percent rarely receives a higher per bushel price. Since the moisture content significantly affects the quantity of grain needed to make a bushel, the moisture content should be as near 12 percent as possible if the seller is to receive the largest possible return on his investment. For these economic reasons it is necessary to carefully control the amount of moisture removed from the grain.

Two principle types of grain dryers are presently available. The first is a "continuous flow" dryer through which grain continually flows while heat is applied to the grain. To control the amount of moisture removed from the grain, the moisture content of the grain leaving the dryer is checked periodically, and depending on whether the moisture content is high or low, the grain flow rate is respectively slowed down or speeded up to vary the time during which grain is exposed to heating. The principle shortcoming of continuous flow dryers is that grain does not flow evenly through the dryer, and thus grain in some parts of the bin has too much moisture removed while grain in other parts has too little removed. The grain leaving the dryer may thus have a wide variation in moisture content. With such wide variation, measurement of the moisture content of grain samples leaving the dryer can provide unreliable data on which to determine the flow rate of the grain. For these reasons it is difficult to obtain uniformly conditioned grain with a continuous flow dryer.

The second type of grain dryer is the "batch" dryer which is designed to dry a load of wet grain to an appropriate moisture content, unload the grain, then reload the dryer, and repeat the cycle. This dryer traditionally applies a single fixed temperature level to a bin of stationary grain for a predetermined time and is theoretically capable of producing conditioned grain having a very uniform moisture content. The grain remains stationary during the cycle to eliminate much of the nonuniform conditioning associated with continuous flow dryers.

One shortcoming of the presently available batch dryers is that they do not process grain as rapidly as the continuous flow dryer. Since batch dryers operate at a single fixed temperature level, the level must be sufficiently low to avoid grain damage at all times during the control cycle. Since grain can withstand only low heat levels late in a control cycle these dryers use the low heat level throughout the cycle. This results in a long, slow, drying period.

Another shortcoming of presently available batch dryers is that they load wet grain into the drying bin throughout the control cycle in order to refill the drying bin as the grain already in the drying bin shrinks in response to heating. Grain shrinkage of as much as 30 percent during conditioning is not unusual and requires that additional grain be loaded into the bin during the control cycle if the dryer is to be used most economically. Unfortunately, wet grain loaded late in the control cycle often does not have ample time to be dried before it is unloaded.

Presently available batch dryers continue to load wet grain at any time during the cycle because the bin must be kept essentially full in order to avoid "venting" of the bin which greatly decreases drying efficiency. A drying bin is ordinarily defined by inner and outer perforated walls between which grain is stored and through which heated air flows. It is desireable that the heated air meet equal flow resistance from the grain at all parts of the bin if air flow is to be uniform throughout the drying bin. If grain shrinkage results in a section of the bin having no grain between inner and outer walls, most of the heated air will "vent" through the unoccupied section, and dryer efficiency will be seriously impaired. Presently available batch dryers load wet grain into the drying bin throughout the drying cycle to insure that no venting occurs at the top of the bin.

SUMMARY OF THE INVENTION

The invention comprises a grain dryer having a control system with a plurality of drying bin temperature regulating electric circuits which maintain a series of successively lower temperature levels in the drying bin defined by thermostats in the circuits. Initially a first temperature regulating circuit maintains a high temperature level in the drying bin for an appropriate time interval at the end of which a clock driven cam actuates one or more switches, turning off the first temperature regulating circuit and turning on a second similar regulating circuit which maintains a lower temperature level. Three such regulating circuits are used with the embodiment shown herein to establish three temperature levels, but a greater or lesser number of heating levels could just as readily be utilized with the invention.

Ordinarily wet grain is heavily moisture laden when harvested and can withstand a higher heat level at the beginning of a drying cycle than later in the cycle when relatively low amounts of moisture remain in the grain. The evaporation of the moisture initially in the grain absorbs much heat which otherwise might burn or crack the grain. Later in the cycle much of the moisture has been evaporated; at that time high heat levels can easily burn or crack the grain. It is therefore desirable to use a high heat level at the beginning of the control cycle and a series of lower heat levels as the control cycle progresses. Such a series of levels dry a load of grain more rapidly than the grain dryers presently on the market, which have only a single heat level selected to be low enough to avoid burning or cracking the grain late in the cycle when most moisture is evaporated.

Each temperature regulating circuit when energized turns on a heater regulator and controls the regulator, causing it to open a fuel valve a predetermined amount to establish a given heating level associated with the particular regulating circuit. Each temperature regulating circuit when energized defines a successively lower heating level. When the temperature level associated with a particular temperature regulating circuit is reached, a thermostat in the circuit is activated to permit the circuit to reduce the rate at which fuel is delivered to the heater so that the desired temperature is not exceeded. When the temperature falls slightly, the thermostat is again activated to increase the fuel supplied to the heater. Each temperature regulating circuit is turned on and off at predetermined times by the clock drive which controls the time during which grain is exposed to each temperature level.

Grain remains substantially stationary in the drying bin during the control cycle, no unloading occuring unit the full cycle is completed. This avoids the problem of uneven grain flow through the bin and results in processed grain with a substantially uniform moisture content.

After the three successively lower temperature levels have been used to condition the grain, a fan circulates air to cool the grain until the grain is unloaded. If desired, the cooling interval can be omitted and the grain unloaded at completion of heating and cooled elsewhere.

A loading circuit controls the operation of the grain loading system which includes a loading auger which distributes wet grain evenly throughout the drying bin. The control system supplies power to the loading circuit to fill the bin with grain before heating commences and also during a part of the control cycle. Late in the control cycle a clock driven cam opens a switch which turns off power to the loading circuit thereby preventing the further loading of wet grain until after the cycle is completed and the conditioned grain unloaded.

The grain dryer invention encounters no problems with venting at the top of the drying bin. The control system supplies adequate quantities of wet grain to the drying bin during the control cycle so as to avoid venting. The most recently added grain drys thoroughly but does not shrink sufficiently to cause venting of the bin.

DESCRIPTION AND OPERATION OF THE INVENTION

Figure 1:
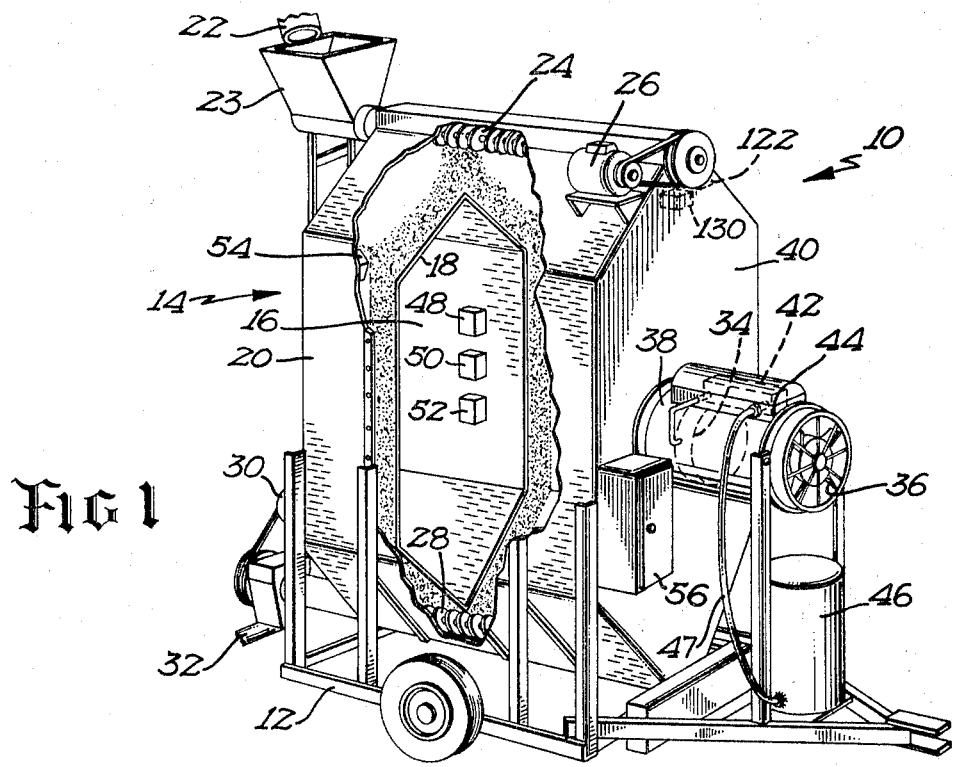
FIG. 1 is a perspective view of a grain dryer with a section of the drying bin removed.

FIG. 1 shows a grain dryer 10 with a frame 12 supporting a grain drying bin 14, which surrounds and defines a central air plenum 16. Both inner wall 18 and outer wall 20 of the drying bin 14 are perforated to permit drying air to flow therethrough from the plenum 16 to the atmosphere. A supply conduit 22 originating at a source of grain (not shown) discharges wet grain into a hopper 23 at the top of the grain dryer 10. A loading auger 24, powered by loading auger motor 26, extends into the hopper 23 in order to convey grain from the hopper to the drying bin and distribute it evenly throughout the length of the bin.

An unloading auger 28, powered by unloading auger motor 30 extends along the bottom of the bin to an exit hopper and conduit 32 and when operated conveys grain from the bin and into the exit conduit, which leads to a storage chamber.

A heater 34 and fan 36, located in housing 38 at the end 40 of the grain dryer, generate heated air which enters the plenum 16 and exhausts through the perforated sides of the bin 14. The heater 34 may be of any type capable of operation at a plurality of different heating levels; if desired several burners may be used to heat the air supplied to the plenum chamber or several fans used to deliver air to the shown plenum. A burner element utilizing a fluid fuel such as gas or oil is satisfactory.

A fuel valve 42 located in valve compartment 44 regulates the fuel supplied to the heater 34 from fuel supply 46. Temperature sensing elements 48, 50, and 52 of thermostats 58, 60, and 62 (FIG. 2) are attached to the plenum side of the inner wall 18 of the bin and maintain three successively lower drying bin temperature levels described hereafter. A clock controlling thermostat 64 has a temperature sensing element 54 located in the drying bin 14 on the outer wall 20 thereof and serves a purpose hereafter explained. A control system box 56 houses the grain dryer control system, described hereafter, which permits the grain dryer 10 to operate as a continuous cycle, batch dryer. Electrical interconnections associated with the electrical components of FIG. 1 are omitted therefrom for simplification.

Figure 2:
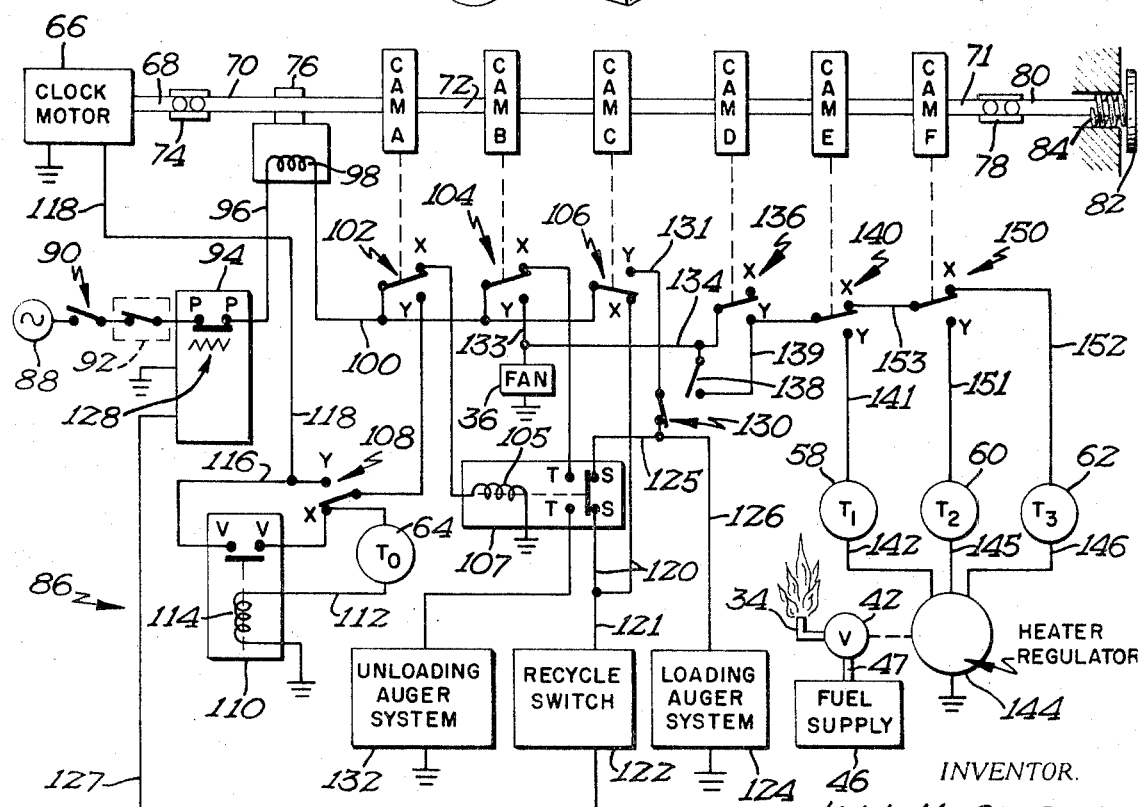
FIG. 2 is a schematic circuit diagram of the control system used with the grain dryer of FIG. 1.

FIG. 2 is a schematic circuit diagram of the grain dryer control system. A conventional clock motor 66 has the clock motor shaft 68 coupled to a first end 70 of a rotatably mounted cam shaft 73 by means of a friction clutch 74. The cam shaft 72 has cams A, B, C, D, E, and F thereon, and although six cams are shown on the shaft it should be understood that a greater or lesser number of cams can be used, the number shown being merely illustrative of one embodiment of the invention.

It should be further understood that although only a single clock motor is shown in FIG. 1, the invention can be practiced using a plurality of such motors. For example, each of the shown cams could be rotated by an individual clock motor connected to the cam through a friction clutch. This would permit the angular displacement of each cam to be individually varied by an operator. Use of a plurality of clock motors is within the purview of the invention.

A solenoid operated clutch 76 exerts a restraining force on the cam shaft 72 as will be further discussed hereafter. The second end 71 of the cam shaft 72 is coupled through a second friction clutch 78 to a control shaft 80 extending from time dial 82, which is accessible to an operator. The control shaft 80 is provided with a spring loading device 84 which will be further described hereafter. The clock motor 66, clutches 74, and 78, shafts 68, 72, and 80, the plurality of cams, spring loading device 84 and time dial 82 collectively form a clock drive.

The object of spring loading device 84 is the establishment of a restoring torque to act on control shaft 80 as the time dial 82 is rotated to an appropriate position by an operator. The angular displacement of dial 82 determines the overall heating time of the grain dryer control cycle which begins with loading of a batch of wet grain and ends with the dryer ready to load a second batch of wet grain.

Rotation of control shaft 80 does not result in immediate rotation of cam shaft 72 because solenoid clutch 76, when energized, grips cam shaft 72 with sufficient force to prevent the control shaft 80 from rotating it. Control shaft 80 is retained in a spring loaded condition by friction clutch 78. When the solenoid clutch 76 is de-energized, spring loading device 84 rotates both control shaft 80 and cam shaft 72 to a position at which heating of the drying bin begins and from which the clock motor will return them to their initial spring loaded condition when the control cycle ends. As the cam shaft 72 is rotated the heater 34 is turned on and heated air begins circulating in the bin. Ordinarily the clock motor is not energized at this stage of the cycle.

Clutch 74 permits the cam shaft 72 to rotate in response to the torque acting on control shaft 80 without the clock motor shaft 68 being rotated. The clutch 74 is selected such that the clock motor can transmit sufficient torque therethrough to cam shaft 72 to turn the cam shaft even when solenoid clutch 76 is gripping the cam shaft. Clutch 78 is constructed so the rotation of cam shaft 72 by clock motor 66 rotates control shaft 80 to gradually restore the spring tension on the control shaft as the cycle progresses. It should be understood that the clock drive system shown is but one clock drive useable with the invention and that other clock drives could have been used and are within the purview of the invention.

The control circuit shown generally at 86 is connected to an electrical power source 88 through power switch 90 and grain supply switch 92. The switch 90 is a master switch to energize and de-energize the entire grain dryer. The grain supply switch 92 detects the presence of a supply of wet grain to be dried. Switch 92 may be a mercury or pressure switch assembly in the hopper 23 or alternatively may be replaced by a timer arranged to turn off all power to the grain dryer 10 when the loading augers run for an unnaturally long period; switch 92 may include a relay controlled by the mercury or pressure switch to turn the entire grain dryer off when the grain supply is exhausted. When grain is present in the hopper 23 the grain supply switch 92 is closed. When the supply of grain is exhausted, the switch 92 opens to automatically turn off the grain dryer.

Switch 92 is connected to thermal time delay relay 94 which ordinarily is closed as shown. Conductor 96 extends from relay 94 to holding coil 98 of solenoid clutch 76. The clutch 76 grips cam shaft 72 when holding coil 98 is energized, preventing cam shaft 72 from being rotated by spring loaded control shaft 80.

Thermal time delay relay 94 opens the terminals P—P in response to a surge of current in coil 128, and holds the terminals open for a time delay before permitting the terminals to reclose. Relay 94 should have a delay time, during which terminals P—P are open, adequate to permit solenoid clutch 76 to release cam shaft 72 and the cam shaft to rotate in response to spring loaded control shaft 80. A delay of 1 to 2 seconds is adequate. The holding coil 98 of the solenoid clutch 76 is energized early in the cycle as soon as the grain drying bin has been filled, as will be described hereafter.

Conductor 100 extends from solenoid clutch 76 to single pole double throw switches 102, 104, and 106 which are mechanically actuated by cams A, B, and C, respectively. Each of the switches 102, 104, 106, 136, 140, and 150 have two alternative positions designated as terminals X and Y. The positions designated as X represent the switch arrangement at the beginning of the control cycle before a batch of wet grain is loaded into the drying bin. As the control cycle proceeds, the switches are moved from the X to the Y terminals, as will be described hereafter.

Switch 102 has its X terminal connected to the holding coil 105 of relay 107. When holding coil 105 is energized, the relay closes a circuit between terminals S—S. When the holding coil 105 is de-energized the relay opens terminals S—S and closes a circuit between terminals T—T.

The Y terminal of switch 102 is connected to a manually operated single pole double throw toggle switch 108. When the toggle switch 108 is at terminal X as shown in FIG. 2, it connects terminal Y of switch 102 to a circuit containing clock controlling thermostat 64 and relay 110. The thermostat 64 has its temperature sensing element 54 mounted in the drying bin 14 at the outer wall 20 thereof. Thermostat 64 forms an open switch so long as a predetermined drying temperature $T_o$ is not exceeded at the outer wall of the bin. When temperature $T_o$ is reached the thermostat 64 closes, and current passing therethrough follows conductor 112 to energize holding coil 114 of relay 110 which closes terminals V—V to complete a circuit from terminal Y of switch 102 through relay 110 and conductors 116 and 118 to clock motor 66. Relay 110 includes circuitry known to the art which assures that once terminals V—V have closed, they do not open until the control cycle has been completed and the conditioned grain has been unloaded. Thus, even if temperature $T_o$ is not maintained during the control cycle, the clock is not stopped. The purpose of thermostat 64 and relay 110 is to permit extremely wet grain to be heated to a desired predetermined temperature so as to drive off excess moisture and then begin a timed drying cycle.

It is sometimes desirable to carefully time the heating periods as for example when unusually dry grains are undergoing a short conditioning period or when seed grains are being processed. In such cases the toggle switch 108 is moved to terminal Y disconnecting the clock controlling thermostat 64 and supplying current directly to clock motor 66 through conductor 118.

Cam acturated single pole double throw switch 106 is shown connected to terminal X which is series connected by conductors 120 and 121 to recycle switch 122 and through terminals S—S of relay 107 and conductors 125 and 126 to loading auger system 124.

The recycle switch 122 may be a mercury switch, pressure switch, or electric eye located near the top of the grain bin. The switch remains open until the grain level reaches the switch and closes it. Once closed the recycle switch can conduct current to conductor 127 which extends to the heating coil 128 of thermal time delay relay 94 which responds to a current surge by opening terminals P—P for a determined time interval. This interrupts the current to solenoid clutch 76, releasing the cam shaft 72 which rotates to a position at which heating begins.

The loading auger system 124 includes loading auger 24, and loading auger motor 26. It may also include apparatus in the supply conduit 22 for closing the conduit when the loading auger motor is off and opening the conduit when it is on.

Terminal Y of single pole double throw switch 106 has a grain level switch 130 connected in series therewith. The switch 130 may be a mercury switch, pressure switch or electric eye which opens the circuit when the level of the grain reaches the switch 130. Conductor 126 extends from switch 130 to the loading auger system 124. Conductor 120, terminals S—S of relay 107, conductor 125, grain level switch 130, and conductors 126 and 131 comprise a grain loading circuit extending from terminals X and Y of switch 106 to the loading auger system 124.

Single pole double throw switch 104 is mechanically actuated by cam B and supplies power from conductor 100 to terminals X or Y of the switch. Terminal X is connected in series through terminals T—T of relay 107 to unloading auger system 132. The unloading auger system 132 includes unloading auger 28 and unloading auger motor 30. If desired it may include a switch at the bottom of the grain bin which opens to turn off the motor when the bin is empty, although this is not essential.

Terminal Y of switch 104 is connected to fan 36. The cam actuated switch 104, conductor 133, and fan 36 collectively form a ventilating circuit for the grain dryer. Connected in parallel with the fan 36 is a heater time controlling circuit which supplies all electrical power to the drying bin temperature regulating circuits, described hereafter. The heater time controlling circuit includes conductor 134 and heater power switch 136 which is mechanically turned on and off by cam D. Switch 136 is closed for a maximum time interval controlled by cam D. When heater power switch 136 opens, heating terminates except as described below. With the shown control circuit the heater 34 can not be operated unless the fan 36 is simultaneously operated. This arrangement is desirable because without fan operation heat builds up adjacent the heater resulting in locally burnt or cracked grain.

Manually operated toggle switch 138 and conductor 139 provide a shunt for the heater time controlling circuit which makes it possible to bypass the cam activated switch 136 when more rapid drying is desired as will be described hereafter.

When either heater power switch 136 or toggle switch 138 is closed, single pole double throw switch 140, which is mechanically actuated by cam E, is electrically connected in parallel with fan 36. When switch 140 is at terminal Y, a first drying bin temperature regulating circuit is energized. This first regulating circuit comprises switch 140, conductor 141, thermostat 58, and conductor 142.

The thermostat 58 has its temperature sensing element 48 located in the plenum on the inner wall 18 of the drying bin. The thermostat 58 is set to maintain a high drying temperature $T_1$ adapted to rapidly remove moisture from the initially wet grain. The most suitable temperature depends on the type of grain and its initial moisture content; 220° F. is an acceptable $T_1$ temperature for most grains. The temperature setting of thermostat 58 can be varied at control box 56 (FIG. 1). Thermostat 58 remains closed until the temperature $T_1$ is reached and then opens. When closed, current flows therethrough to heater regulator 144 which may consist of any known electromechanical transducer capable of opening valve 42 predictable amounts in reponse to current reaching it through conductors 142, 145, or 146. Cam E is constructed to keep switch 140 at terminal Y for a predetermined time interval during which the high heating level associated with temperature $T_1$ is maintained. By properly setting time dial 82 the time can be increased or decreased.

The heater regulator selected should be a transducer capable of opening valve 42 a plurality of different amounts in response to a plurality of different inputs. The valve 42 controls fuel flow through fuel line 47 extending from fuel source 46 to the heater 34. Although the heater is shown as being a fluid fuel burner, it can be electrical.

Terminal X of switch 140 is connected to conductor 153 which comprises a circuit leading to single pole double throw switch 150 which is mechanically actuated by cam F. Switch 150 is connected to its terminal Y after the release of shaft 72 by solenoid clutch 76; terminal Y is series connected to thermostat 60 and heater regulator 144. The switch 150, conductor 151, thermostat 60 and conductor 145 comprise a second drying bin temperature regulating circuit controlling regulator 144 to open valve 42 a predetermined amount less than that caused by the first temperature regulating circuit. The thermostat 60 has a temperature sensing element 50 in the plenum. Thermostat 60 is similar to thermostat 58 but is set for a lower temperature $T_2$ which can be varied at the control box but which typically may be 190° F. So long as this temperature is not reached the thermostat 60 remains closed conducting current to the heater regulator to open valve 42 an amount less than that produced by the first regulating circuit to establish a medium temperature level $T_2$ at the drying bin when the second regulating circuit is energized.

Switch 150, conductor 152, thermostat 62, and conductor 146 collectively comprise a third drying bin temperature regulating circuit. Thermostat 62 has a temperature sensing element 52 element 52 attached to the inner wall 18 of the drying bin, and the temperature setting can be varied from the control box 56. Thermostat 62 is set for temperature $T_3$ which is less than $T_1$ or $T_2$, such as 160° F. Until the temperature $T_3$ is reached, the thermostat 62 remains closed, permitting current to flow therethrough to heater regulator 144 which responds by opening valve 42 an amount less than that produced by either of the two temperature regulating circuits already discussed so that heater 34 operates at a low heating level. When thermostat 62 opens, heater regulator 144 reduces fuel flow through valve 42, reducing the heat output of the heater.

It should be understood that only one of the three temperature regulating circuits disclosed can control the heater regulator 144 at one time. If no current is supplied to the regulator 144 through a temperature regulating circuit, the regulator may turn off valve 42 and thereby reduce the heat produced by heater 34. It should be understood that even though only three temperature regulating circuits are shown, the invention can use a greater or lesser number of such circuits to establish a greater or lesser number of temperature levels.

Although the drying bin temperature regulating circuits are referred to herein as regulating the temperature of the drying bin, it should be understood that the circuits measure the temperature changes at the sensing elements 48, 50, and 52 which are located adjacent the drying bin in the plenum chamber 16 and regulate the temperature of air in the plenum. The drying bin temperature can be adequately regulated by regulating the temperature of air in the plenum because plenum air flows from the plenum directly into the drying bin.

The heater regulator 144 need not turn off valve 42 so that no fuel reaches heater 34. The regulator 144 works satisfactorily if it merely reduces the fuel flow through valve 42 when the desired temperature $T_1$, $T_2$, or $T_3$ has been reached and increases the flow when the temperature drops below the desired temperature. The shown off — on thermostats 58, 60, and 62 can then be replaced by thermostats capable of producing a first signal when the desired temperature is reached or exceeded and producing a second signal when a lower temperature is present. The first signal can be used to activate regulator 144 to reduce fuel flow to the heater and the second signal to increase the fuel flow thereto.

In operation, an operator first closes the power switch 90 supplying power to grain supply switch 92. If a supply of grain is available to be dried, the supply switch 92 is closed as shown and current flows through terminals P—P of thermal time delay relay 94. When the supply of grain is exhausted, grain supply switch 92 opens, and the entire grain dryer control system turns off.

Thermal time delay relay 94 is ordinarily in a closed condition conducting current across terminals P—P to holding coil 98 of solenoid clutch 76 and thence to conductor 100 which supplies power directly to cam actuated switches 102, 104, and 106. So long as holding coil 98 of solenoid clutch 76 is energized, the clutch restrains cam shaft 72, and time dial 82 cannot transmit rotation to the cam shaft. After an operator has connected the grain dryer 10 to a power source 88, he rotates time dial 82 to determine the time duration of the control cycle. The angular displacement of dial 82 is proportional to the time duration. Typically the time selected may be 90 minutes, however this time can be increased or decreased depending on moisture content of the grain and the type of grain to be dried. It should be understood that it is possible to quite accurately predict required drying time when the initial moisture content of the grain is known. Rotation of dial 82 causes spring loading device 84 to exert a restoring torque on control shaft 80. The friction clutch 78 connecting control shaft 80 to cam shaft 72, however, prevents rotation of control shaft 80 by retaining the shaft 80 at its spring tensioned position so long as solenoid clutch 76 is energized and prevents rotation of cam shaft 72. At this point the control cycle has not yet commenced and the cams on cam shaft 72 have not yet rotated. Cam actuated switches 102, 104, 106, 136, 140, and 150 are in contact with the terminals indicated as X, and clock motor 66 is turned off.

Current from conductor 100 flows through switch 102, which is mechanically actuated by cam A, to the holding coil 105 of relay 107, closing terminals S—S of the relay, permitting the loading auger system 124 to be operated as hereafter described. Switch 104 actuated by cam B is also at terminal X, but since terminals T—T of relay 107 are open, no current can reach unloading auger system 132 which thus remains inactive. Since switch 104 is at terminal X, no current reaches fan 36 or the heater time controlling circuit.

Switch 106, actuated by cam C, contacts terminal X, permitting current to flow to the recycle switch 122 through conductors 120 and 121 and to the loading auger system 124 through terminals S—S of relay 107 and conductors 125 and 126. Since the recycle switch 122 remains open so long as the grain bin is empty no current flows through the recycle switch to heating coil 128 of thermal time delay relay 94. Current does, however, flow to the loading auger system, and as a result grain moves from supply conduit 22 into hopper 23, and loading auger motor 26 is energized to turn loading auger 24 which distributes the incoming grain evenly along the length of the drying bin. The loading continues until the grain reaches the level of recycle switch 122 at the top of the grain bin and closes the recycle switch.

As the recycle switch is closed, current flows from terminal X of switch 106, through the recycle switch, along conductor 127 to energize heating coil 128 of thermal time delay relay 94. As a result, terminals P—P open and current through relay 94 is interrupted for a short time interval sufficient to de-energize holding coil 98 of solenoid clutch 76 causing the clutch to release its grip on cam shaft 72. Since the cam shaft is already spring tensioned by spring loading device 84, shaft 72 immediately rotates causing the cams thereon to move to a new position from which the clock motor 66 will gradually rotate them back to the starting position. The friction clutch 74 permits the cam shaft to move to the said new position without rotating the clock motor shaft 68. At this point in the cycle the clock motor is still turned off.

Rotation of cam shaft 72 moves cam actuated switches 102, 104, 106, 136, 140, and 150 to their respective Y terminals, de-energizing the X terminals. Switch 102, actuated by cam A, thus no longer supplies current to holding coil 105 of relay 107, and thus relay 107 opens terminals S—S and close terminals T—T. Simultaneously switch 104, actuated by cam B, interrupts current flow to terminal X, thus preventing the unloading auger system 132 being energized even though terminals T—T of relay 107 are closed. Switch 106, actuated by cam C, moves from terminal X to Y, preventing current from reaching recycle switch 122 from terminal X. Since current no longer reaches recycle switch 122, heating coil 128 of thermal time delay relay 94 is no longer energized, and current once again flows through conductor 96 to solenoid clutch 76, which regrips the cam shaft 72. It should be understood, however, that the solenoid clutch 76, does not exert sufficient force on cam shaft 72 to prevent the clock motor 66 from turning the cam shaft once the clock motor has been turned on.

Switch 104, actuated by cam B, supplies current from its terminal Y to fan 36; current flows from switch 104 through conductors 133 and 134 to heater power switch 136, which is now at terminal Y. Current continues from switch 140 through conductor 141, thermostat 58 and conductor 142 to heater regulator 144. Thermostat 58 detects that temperature $T_1$ has not been reached and signals the heater regulator 144 which opens valve 42 a predetermined first amount sufficient to establish a first heating level in the drying bin. This first heating level is a high level designed for rapid drying. The regulator continues to permit a high fuel flow to the heater until temperature $T_1$ is reached. The thermostat 58 then detects that $T_1$ has been obtained and signals the regulator 144 to reduce the fuel flowing through valve 42 by reducing the valve opening. In this way thermostat 58 and regulator 144 maintain the temperature of drying bin air in a temperature range near $T_1$.

Fan 36 blows the heated air into plenum 16, from which it passes through the grain and exhausts to the surrounding atmosphere. Since the grain has a high moisture content when loaded it can easily absorb the initial high heat output without damage to the grain. The dryer thus supplies heat energy to the grain at an initially high level drying the grain rapidly when its high moisture content makes it capable of withstanding high temperature. The high initial heat level significantly shortens the overall required conditioning time.

Switch 102, actuated by cam A, conducts current from conductor 100 to terminal Y and thence through toggle switch 108 to clock controlling thermostat 64 which is set for a predetermined temperature $T_o$ which may be varied by an operator. The thermostat 64 remains open, passing no current therethrough until the temperature $T_o$ is reached. When this temperature $T_o$ is reached, thermostat 64 closes and current passes therethrough to holding coil 114 of relay 110. In response, relay 100 closes terminals V—V permitting current to flow therethrough and along conductors 116 and 118 to turn on clock motor 66 which now begins operating. Terminals V—V remain closed until the clock motor is finally turned off by switch 102 in order to assure that the timed control cycle is not interrupted once it begins.

The clock controlling thermostat 64 assures that the timed heating of the grain does not begin until a predetermined drying temperature $T_o$ has been reached. The thermostat 64 is particularly useful when the grain has an unusually high moisture content and large quantities of heat must be expended before the grain at the outer wall of the bin reaches temperature $T_o$. In such a case, if thermostat 64 were not present, the timed drying levels might be insufficient to condition grain. Thermostat 64 prevents the timed drying period from commencing until temperature $T_o$ is reached at the outer wall 20 of the bin.

If for any reason the operator does not wish to use the clock controlling thermostat 64 to activate the clock motor 66, the operator moves toggle switch 108 to terminal Y and the clock will be energized as soon as switch 102 moves to its terminal Y when cam shaft 72 rotates in response to de-energized solenoid clutch 76. In grain which contains little moisture or grain which is extremely sensitive to heat, such as seed grain, it is often helpful if the time interval during which grain is exposed to heat is completely time controlled. This is made possible by toggle switch 108.

Switch 106 actuated by cam C, now in contact with its terminal Y, permits current to flow through conductor 131, grain level switch 130, and conductor 126, to the loading auger system 124. No current can pass from terminal Y of switch 106 to the recycle switch 122 since terminals S—S of relay 107 have been opened. The grain level switch 130 remains open so long as the drying bin is full. When the grain level drops due to grain shrinkage the switch 130 closes, and the loading auger system 124 is energized to load additional wet grain into the drying bin. This additional loading step can occur during most of the control cycle, but late in the cycle before heating has ended cam C turns switch 106 to terminal X to cut off power to the loading auger system. Thus no wet grain is loaded into the bin at a stage in the control cycle which would leave inadequate remaining drying time to thoroughly condition the newly added wet grain. All grain then in the bin will be thoroughly conditioned at the end of the cycle. The amount of drying time for the newly added wet grain varies, of course, depending on the type of grain and its moisture content.

The grain drying bin 14 encounters no venting problem at the top thereof since wet grain is added during much of the cycle in response to grain shrinkage. When the loading auger system 124 is finally turned off to prevent further loading, the remaining drying time is sufficiently short that the resulting shrinkage is inadequate to produce venting problems but still adequate to thoroughly condition the grain.

After the first temperature regulating circuit turns on the heater 34, the heating continues at the high temperature level $T_1$ for a predetermined interval timed by clock motor 66. After a predetermined time interval adequate to significantly reduce the moisture content of the grain, cam E moves switch 140 from terminal Y to X thus turning off the first drying bin temperature regulating circuit and conducting current through conductor 153 and to terminal Y of switch 150 which supplies current to the second temperature regulating circuit which then establishes and maintains a medium temperature $T_2$ determined by thermostat 60 for a predetermined time. Thermostat 60 measures the temperature at sensing element 50 and signals the heater regulator 144 to increase the fuel flow through fuel valve 42 if the temperature is less than $T_2$ and decreases fuel flow if the temperature is greater than $T_2$. Thus the second temperature regulating circuit permits heater 34 to maintain a medium heat level near temperature $T_2$.

After a predetermined time interval has elapsed, cam F rotates sufficiently to move switch 150 from terminal Y to terminal X which turns off the second temperature regulating circuit and energizes the third. This third temperature regulating circuit has a thermostat 62 which maintains a temperature level near temperature $T_3$ at the drying bin just as thermostats 58 and 60 maintained their temperature levels when energized.

After a predetermined time interval elapses, cam D rotates sufficiently to move switch 136 from terminal Y to X, which turns off all power to the temperature regulating circuits. After switch 136 opens, heater 34 provides no further heat during the control cycle.

Even through the heater is off, fan 36 continues to circulate air through the bin so long as switch 104 is at terminal Y. This air circulation cools the grain prior to its being unloaded. After an additional time period has elapsed, cam B turns sufficiently to move switch 104 from terminal Y to terminal X to turn off fan 36.

When a large quantity of grain is to be dried, and an outside storage bin in which the grain can be cooled is available, it is sometimes helpful to omit the cooling period just described and transfer the grain to the outside bin for cooling. If the operator wishes to omit the cooling period, he closes toggle switch 138 which provides a shunt to bypass heater power switch 136. This results in the third temperature regulating circuit maintaining temperature level $T_3$ until cam B moves switch 104 from terminal Y to terminal X.

When switch 104, actuated by cam B, returns to terminal X, fan 36 is de-energized and current from conductor 100 flows through switch 104 and terminals T—T of relay 107 to unloading auger system 132, turning on unloading motor 30 which activates the unloading auger 28 removing the conditioned grain from the drying bin to a storage bin.

After the elapse of a predetermined time interval adequate to unload the grain, cam A actuates switch 102, moving it from terminal Y to terminal X, turning off the clock motor 66 and re-energizing holding coil 105 of relay 107 to open terminals T—T and close terminals S—S.

Switch 106, actuated by cam C, is now at terminal X permitting current to flow through conductor 120, terminals S—S of relay 107 and conductors 125 and 126 to loading auger system 124. The loading auger motor 26 turns on and grain is again loaded into the drying bin. When the grain reaches a level adequate to close recycle switch 122, current flows along conductor 127 to the heating coil 128 of relay 94, and the relay 94 opens terminals P—P to briefly de-energize solenoid clutch 76. It should be understood that the rotation of shafts 72 and 80 by clock motor 66 during the already described control cycle restores the spring tension exerted on the shaft 80 by spring loading device 84. De-energizing solenoid clutch 76 permits the shafts 72 and 80 to rotate to the already described position at which heating begins and from which the control cycle repeats the already described operations and continually recycles so long as wet grain is available. When the grain supply is exhausted, grain supply switch 92 opens and the control circuit turns off the grain dryer automatically.

While a preferred embodiment of the present invention has been described, it should be understood that various changes, adaptations and modifications may be made in the structure, circuitry and circuit components shown herein without departing from the spirit of the invention and the scope of the appended claims.

What is claimed is:

1. A grain dryer having a control cycle for conditioning wet grain comprising:
   a frame;
   a grain drying bin attached to the frame to hold a supply of wet grain to be conditioned;
   a heater and fan mounted to said frame to heat and circulate air through the drying bin;
   a clock drive including at least one clock motor and a plurality of cams rotatably coupled to the clock motor for rotation thereby;
   a plurality of drying bin temperature regulating electric circuits, each circuit including a thermostat and a switch actuated by one of the cams to close and open the circuit at predetermined times in the control cycle, each regulating circuit maintaining a predetermined drying bin temperature level defined by the thermostat in the circuit when the switch is closed and the circuit energized; and
   a heater regulator responsive to the said regulating circuits to vary heat output of the heater so as to maintain predetermined temperature levels defined by the temperature regulating electric circuits;
   a loading auger system for loading grain into the drying bin; and
   a loading circuit responsive to said clock drive and controlling said loading auger system to load grain into the bin during the control cycle so that additional grain is loaded as the grain in the drying bin shrinks in response to heating, said loading circuit having a cam operated switch arranged to prevent the loading of wet grain after elapse of a predetermined time in the control cycle thus permitting ample remaining time in the cycle for all wet grain then in the bin to be thoroughly conditioned.

2. The combination according to claim 1 wherein said plurality of drying bin temperature regulating circuits includes successively operating first, second, and third circuits whose thermostats define three successively lower temperature levels.

3. The combination according to claim 2 wherein the switches of said first, second, and third drying bin temperature regulating circuits include first and second single pole double throw cam actuated switches, said first single pole double throw switch when in a first position closing the first drying bin temperature regulating circuit and opening a circuit leading to a second single pole double throw switch, and when in a second position opening said first heater temperature regulating circuit and closing the said circuit leading to the second single pole double throw switch, the second single pole double throw switch when in a first position closing a second drying bin temperature regulating circuit and opening a third drying bin temperature regulating circuit and when in a second position opening the second drying bin temperature regulating circuit and closing the third drying bin temperature regulating circuit.

4. The combination according to claim 1 wherein the control system includes a heater time controlling circuit through which power to said drying bin temperature regulating circuits flows, said heater time controlling circuit including a heater power switch actuated by one of the cams to connect the heater time controlling circuit to a power source for a predetermined time interval and then disconnect.

5. The combination according to claim 4 including a shunt making said heater time controlling circuit bypassable.

6. The combination according to claim 4 wherein the control system has a ventilating circuit for energizing the fan, said ventilating circuit further including a cam actuated switch to open and close the ventilating circuit, the ventilating circuit supplying power to the heater power switch of said heater time controlling circuit and therethrough to said heater regulator so that the heater can operate only when the ventilating circuit is closed.

7. The combination according to claim 1 wherein said heater is energized by a fluid fuel and said regulator is an electro mechanical transducer responsive to said temperature regulating circuits to control fuel flow through a valve to supply said fluid fuel to the heater at a plurality of different rates to thereby establish and maintain a plurality of different heating levels defined by the temperature regulating electric circuits.

8. The combination according to claim 1 wherein said control system includes a recycle switch located in the drying bin and a clock controlling thermostat, the recycle switch closing when the grain level in the bin reaches the switch, said recycle switch electrically connected to a thermal time delay relay arranged to trigger the release of a cam shaft permitting a switch actuated by a cam on the cam shaft to energize the clock controlling thermostat, said clock controlling thermostat closing to energize the clock motor when a predetermined drying temperature is reached thereby permitting a timed heating period to commence when the bin reaches the said predetermined drying temperature.

9. The combination according to claim 8 wherein said clock controlling thermostat is shunted to permit the clock motor to have full control of the heating period.

10. A grain dryer having a control cycle for conditioning wet grain comprising:
a supporting frame;
a grain drying bin to hold a supply of wet grain to be conditioned;
a heater and fan mounted to the frame to heat and circulate air through the drying bin;
a loading auger system for loading grain into the drying bin;
a clock drive including a clock motor and a plurality of cams rotatably coupled to the clock motor for rotation thereby;
circuit means including switches operated by said cams for controlling operation of said heater and fan; a loading circuit responsive to said clock drive and responsive to the level of grain in the dryer and controlling said loading auger system to load grain into the bin during the control cycle so that additional grain is loaded as the grain in the drying bin shrinks in response to heating, said loading circuit having a clock drive controlled cam operated switch arranged to prevent the loading of wet grain after elapse of a predetermined time in the control cycle, said fan and heater circuit means continuing operation of said fan and heater for a predetermined time after said loading circuit has been interrupted thus permitting ample remaining time in the cycle for all wet grain then in the bin to be thoroughly conditioned.

11. The combination according to claim 10 wherein the cam operated switch is a single pole double throw switch which energizes and de-energizes the said switch energizing said loading circuit when in first position.

12. The combination according to claim 11 wherein said loading circuit includes a relay operated switch which remains in an open condition when the clock drive is energized.

13. The combination according to claim 10 wherein said switch also energizes said loading circuit when in a second position.

14. A grain dryer having a control cycle for conditioning wet grain comprising:
a supporting frame;
a grain drying bin attached to the frame to hold a supply of wet grain to be conditioned;
a heater and fan adjacent the drying bin to circulate air therethrough;
a clock drive including a plurality of cams rotatably coupled to the clock drive for rotation thereby;
a plurality of drying bin temperature regulating electric circuits, each circuit including a thermostat and a switch activated by one of the cams to close and open the circuit at predetermined times in the control cycle, each regulating circuit maintaining a predetermined drying bin temperature level defined by its thermostat when the switch is closed and the circuit energized; and
a heater regulator responsive to the said regulating circuits to vary heat output of the heater so as to maintain predetermined temperature levels defined by the temperature regulating electric circuits thereby providing a plurality of different drying bin temperature levels for conditioning grain.

15. The combination according to claim 14 and further including a clock controlling thermostat for sensing the temperature at the drying bin and arranged to close a circuit supplying electrical power to the clock motor when a predetermined temperature is sensed, so a timed heating period is commenced by the clock motor after a given amount of grain conditioning has already occurred during the time elapsing for the bin to reach the said predetermined temperature.

16. A grain dryer having a control cycle for conditioning wet grain comprising:
a supporting frame;
a grain drying bin attached to the frame to hold a supply of wet grain to be conditioned;
a heater and fan adjacent the drying bin to circulate air therethrough;
a plurality of drying bin temperature regulating electric circuits, each circuit including a thermostat and a switch to be activated to close and open the circuit at predetermined stages in the control cycle, each regulating circuit maintaining a predetermined drying bin temperature level defined by its thermostat when the switch is closed and the circuit is energized;
a heater regulator responsive to the said regulating circuits to vary heat output of the heater so as to maintain predetermined temperature levels defined by the temperature regulating electric circuits thereby providing a plurality of different drying bin temperature levels for conditioning grain; and
means to operate said switches of the temperature regulating circuits after the heated air has been circulated through the grain in the bin for a time to dry the grain and then change the temperature level of the air circulated through the grain.

17. The grain dryer according to claim 16 and including a plenum through which the heated air from the fan travels to the grain drying bin, said thermostats of the bin temperature regulating electric circuit being disposed in said plenum to sense the temperatures of the air at the predetermined drying bin temperature levels.

* * * * *